(12) United States Patent
Wolters et al.

(10) Patent No.: US 12,126,861 B2
(45) Date of Patent: Oct. 22, 2024

(54) LATENCY MANAGEMENT FOR CONTENT DELIVERY

(71) Applicant: DOLBY INTERNATIONAL AB, Amsterdam Zuidoost (NL)

(72) Inventors: Martin Wolters, Nuremberg (DE); Kurt Krauss, Nuremberg (DE)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 84 days.

(21) Appl. No.: 17/627,017

(22) PCT Filed: Jul. 15, 2020

(86) PCT No.: PCT/EP2020/070042
§ 371 (c)(1),
(2) Date: Jan. 13, 2022

(87) PCT Pub. No.: WO2021/009255
PCT Pub. Date: Jan. 21, 2021

(65) Prior Publication Data
US 2022/0256236 A1    Aug. 11, 2022

Related U.S. Application Data

(60) Provisional application No. 62/875,063, filed on Jul. 17, 2019.

(30) Foreign Application Priority Data

Jul. 17, 2019 (EP) .................................... 19186801

(51) Int. Cl.
*H04N 21/4402* (2011.01)
*H04N 21/435* (2011.01)

(52) U.S. Cl.
CPC ....... *H04N 21/4402* (2013.01); *H04N 21/435* (2013.01)

(58) Field of Classification Search
CPC ............. H04N 21/4402; H04N 21/435; H04N 21/4318; H04N 21/4348;
(Continued)

(56) References Cited

U.S. PATENT DOCUMENTS

| 6,097,435 A | 8/2000 | Stanger |
| 8,145,780 B2 * | 3/2012 | Katis .................. H04L 65/1083 709/224 |

(Continued)

FOREIGN PATENT DOCUMENTS

| CN | 1689264 A | 10/2005 |
| CN | 101466034 A | 6/2009 |

(Continued)

OTHER PUBLICATIONS

ETSI, Digital Video Broadcasting (DVB), MPEG-DASH Profile for transport of ISO BMFF Based DVB services over IP Based Networks, Feb. 2020.

(Continued)

*Primary Examiner* — Helen Shibru

(57) ABSTRACT

The present document discloses a method for playback of media content via a delivery channel. The delivery channel may generally refer to the channels through which audio or video programs are delivered (transmitted) to the user (receiver). The media content may generally comprise consecutive media programs. In particular, for a specific media program within the media content, a respective content type for that specific media program is also provided. The method may comprise receiving an indication of the sensitivity of a media program to playback latency. The method may further comprise receiving at least a portion of the media program.

(Continued)

100

The method may yet further comprise adapting the playback of the media program based on the indication of its sensitivity to playback latency.

16 Claims, 4 Drawing Sheets

(58) Field of Classification Search
CPC ....... H04N 21/440281; H04N 21/8456; H04N 21/84; H04N 21/235; H04N 21/2625; H04N 21/462
USPC ........................................................ 386/264
See application file for complete search history.

(56) References Cited

U.S. PATENT DOCUMENTS

| | | | |
|---|---|---|---|
| 8,238,361 B2 | 8/2012 | Carlsson | |
| 8,472,322 B2 | 6/2013 | Black | |
| 8,885,818 B2 * | 11/2014 | Boehm | G11B 20/00173 380/42 |
| 9,398,346 B2 | 7/2016 | Brooks | |
| 11,405,662 B2 * | 8/2022 | Hassler | H04N 21/8456 |
| 2005/0166135 A1 | 7/2005 | Burke | |
| 2008/0120389 A1 | 5/2008 | Bassali | |
| 2008/0232763 A1 | 9/2008 | Brady | |
| 2009/0161765 A1 * | 6/2009 | Joyce | H04N 9/8042 375/240.23 |
| 2014/0101341 A1 | 4/2014 | Colenbrander | |
| 2014/0101342 A1 * | 4/2014 | Colenbrander | G06F 3/1423 710/14 |
| 2015/0312294 A1 | 10/2015 | Olsen | |
| 2017/0206906 A1 | 7/2017 | Jung | |
| 2023/0059063 A1 * | 2/2023 | Larsen | H04N 21/8456 |

FOREIGN PATENT DOCUMENTS

| | | | |
|---|---|---|---|
| CN | 101583025 A | 5/2011 | |
| CN | 105429984 A | 3/2019 | |
| CN | 108235136 A | 6/2021 | |
| KR | 20160006106 A | 1/2016 | |
| RU | 2554070 | 6/2015 | |
| WO | WO-2004019530 A1 * | 3/2004 | ............. H04L 29/06 |

OTHER PUBLICATIONS

ITU ISO/IEC 23009-1, Information technology—Dynamic Adaptive streaming Over HTTP (DASH) Part 1: Media Presentation Description and Segment Formats, 2019.
Lin Yuhua et al: "Cloud Fog: Towards High Quality of Experience in Cloud Gaming", International Conference on Parallel Processing, IEEE, Sep. 1, 2015 (Sep. 1, 2015), pp. 500-509.
Rejai E R et al: Layered quality adaptation for Internet video streaming11 , IEEE Journal on Selected Areas in Communications, IEEE Service Center, Piscataway, US, vol. 18, No. 12, pp. 2530-2543, Dec. 1, 2000.
Steinbach E et al: "Adaptive playout for low latency video streaming", Proceedings 2001 International Conference on Image Processing. ICIP 2001—Thessaloniki, Greece, Oct. 7-10, 2001; International Conference on Image Processing], Institute of Electrical and Electronics Engineers, New York, NY, vol. 1, Oct. 7, 2001 (Oct. 7, 2001), pp. 962-965.
Chris Poole: "Low latency signalling spec proposals", DVB, Digital Video Broadcasting, C/O EBU—17A Ancienne Route—CH-1218 Grand Saconnex, Geneva—Switzerland No. r9 Jan. 8, 2019 (Jan. 8, 2019). 13 pages.

* cited by examiner

LATENCY MANAGEMENT FOR CONTENT DELIVERY

CROSS-REFERENCE TO RELATED APPLICATIONS

This application claims priority of the following priority applications: U.S. provisional application 62/875,063 (reference: D18140USP1), filed 17 Jul. 2019 and EP application 19186801.7 (reference: D18140EP), filed 17 Jul. 2019, which are hereby incorporated by reference.

TECHNICAL FIELD

The present document relates to latency management for content delivery. In particular, the present document relates to a traditional "24/7" broadcast channel (or any channel with consecutive programs) and its delivery over IP networks.

BACKGROUND

Generally speaking, a traditional "24/7" broadcast channel typically consists of consecutive programs such as news, movies, advertisement, episodes, (live) game shows, live sports, etc. Usually, in such broadcast channel, transmitting the right program at the right time is automated through specific (program) schedulers.

One of the many challenges of delivery of A/V content(s) over IP networks is latency. In general, consumers value low latency of delivery for live broadcast (e.g., sports, live game shows, etc.). However, achieving low latency over IP networks is not generally possible all the time and typically comes at a (bitrate) cost for the operator. In addition, it is well known that low latency streaming is more likely to experience buffer underruns (for example caused by jitter of the network connection) compared to high latency streaming, since the low latency streaming typically means smaller buffer to be used in the playback device.

Today, latency is usually associated with a stream and is considered to be constant over (at least a period of) time for a given stream. However, only a few programs on a broadcast channel are latency sensitive (such as live sports) while others are not (such as movies).

Thus, there is need for low latency streaming mainly for programs that need low latency (such as live sports), and it is possible to switch to higher latencies when programs are not sensitive to latency (such as movies).

SUMMARY

In view of some or all of the above problems (and use cases), the present disclosure proposes a method and a device for playback of media content via a delivery channel and a system for delivery of media content via a delivery channel, having the features of respective independent claims.

As a broad aspect, the present disclosure provides a method for playback of media content via a delivery channel. The delivery channel may generally refer to the channels through which audio or video programs are delivered (transmitted) to the user (receiver), such as in a broadcast, multicast, or unicast manner. For example, such delivery channel may be a (traditional) "24/7" broadcast channel. The media content may generally comprise consecutive media programs such as news, movies, advertisement, episodes, (live) game shows, live sports, etc. In particular, for a specific media program within the media content, a respective content type for that specific media program is also provided together with the media content. As will be understood and appreciated by the skilled person, the content type may be represented and delivered in any suitable manner. For example, the content type may be represented or indicated using a specific or an additional field in a header of a bitstream of the media program or in metadata accompanying a program. As another example, the content type may be indicated using a lookup table. Similarly, the content type may be delivered (transmitted) alongside the delivery of the media program in real time or may be shared before the delivery of the media program. The media content may be carried in a media stream and delivered via communication network, e.g. an Internet Protocol based network, from a content delivery server to user devices.

In particular, the method may comprise (a step of) receiving (e.g., at a user device, receiver or playback device) an indication of the sensitivity of a media program to playback latency (also called target latency for the media program). More particularly, the sensitivity of the media program to playback latency is associated with the content type of the media program. In other words, the sensitivity of the media program to playback latency is set based on the content type of the media program. However, there may be other factors influencing the desired playback latency. For example, while live sports may in general favor low latency, a service operator may want to distinguish between sport programs where low latency is very important (final match of a major event) versus not as critical for less important games. Thus, adapting the playback of the media program based on the indication of its sensitivity to playback latency shall not exclude that other factors are considered as well for determining the target playback latency.

The method may further comprise receiving at least a portion of the media program. As will be understood and appreciated by the skilled person, a portion of a media program generally refers to a certain number of frames (pictures, chunks of data, etc.) of the media program, depending for example on the representation and/or the delivery method/mechanism of the media program. The method may yet further comprise adapting the playback of the media program based on the indication of its sensitivity to playback latency.

In some examples, another indication of the sensitivity of a media program to playback latency is received and the playback of the same media program is gradually adapted based on the received indications. This may be repeated multiple times so that a plurality of target latencies is provided in sequence to the playback device. Employing multiple indications of sensitivity may be used, for instance, to gradually manage playback characteristics before a transition to a subsequent or another program, as a transition which could otherwise cause a dropout or have other detrimental impact on user experience due to a jump in target latency between programs. Thus, in addition to a single jump in target latency based on a single indication, an adaptation of the playback of the media program over a certain time period is suggested. This allows that one can gradually (in multiple steps) change the target latency on the server side, hence remotely controlling the adaptation speed on the receiver (decoder) side by the received sequence of playback latency indications.

In some examples, the adaption of the playback of the media program may comprise adapting the buffering of the media program e.g. at the receiver or playback device. In particular, the step of adapting the playback of the media program may comprise adapting the amount of media program data that is buffered (at the playback device) before the media program data is played back. As will be appreciated by the skilled person, the buffering mechanism (at the playback device) may be implemented at an application level, at a system level, or in any other suitable manner. Multiple incremental indications for changes in sensitivity of a media program to playback latency may be applied, for instance, to gradually manage the receiver buffer level before a transition to a subsequent or another program, as a transition which could otherwise cause a dropout or have other detrimental impact on user experience due to a jump in target latency between programs.

In some examples, the indication of the sensitivity of a media program to playback latency may comprise a qualitative indication or a quantitative indication of latency that is acceptable before the media program data is played back. By way of example, the qualitative indication of latency may relate to sensitivity of the played-back media program to latency for a user, e.g. whether a longer latency would be noticeable to the program viewer(s) and/or whether a short latency would cause noticeable artefact(s) (e.g., jitter, frame drop, etc.). In some cases, such qualitative indication may be simply represented as "high", "middle" or "low". On the other hand, the quantitative indication of latency may for example be a maximum or target latency (e.g., 5 seconds) that is acceptable.

In some examples, the adaption of the playback of the media program may comprise adapting a playback speed for the media program. In some cases, the playback speed of the media program may be represented for example as the number of frames per second (fps). For instance, if a normal speed of playing back a program is at 20 fps, then doubling the speed of the playback would mean the program is played back at 40 fps.

In some examples, the playback of the media program may comprise modifying the content of the received media program. In particular, the content of the received media program may be modified if the indication of sensitivity to playback latency for the media program changes with respect to a previous or a subsequent media program of the delivery channel. Generally speaking, in some cases, this means that the playback device (e.g., an application of the playback device) may skip some or the complete segments (frames) of the media program, for example in order to catchup up. In some other cases, the playback device (e.g., an application of the playback device) may need to insert e.g. some "silent" or repetitive segments or frames, in order to slow down. Such changes are typically noticeable by the viewer and may therefore be considered as less desirable in some cases/scenarios.

In some examples, additional content (e.g., in terms of frames or segments) may be inserted in the current media program. In particular, the insertion of the additional content(s) may be performed if the current media program allows for a larger latency with respect to the previous media program or the subsequent media program allows for a larger latency with respect to the current media program. In some cases, this may mean that the buffer size at the playback device has to be enlarged and that the buffer can be filled up properly.

In some other examples, content (e.g., in terms of frames or segments) may be skipped in the current media program. In particular, the skipping of the content(s) may be performed if the current media program requires a smaller latency with respect to the previous media program or the subsequent media program requires a smaller latency with respect to the current media program. In some cases, this may mean that the buffer size at the playback device has to be reduced and the buffer can be emptied properly.

In some examples, a media program may be considered to comprise a plurality of consecutive segments. The segmentation may depend for example on the applied transport mode or transport format for transmitting the media program to the receiver. That is to say, in this case, the internal processing of the media player may be organized in terms of segments. Correspondingly, the adaption of the playback of the media program may then comprise adapting the number of buffered segments before the media program data is played back. Optionally, at least one segment of the media program may be skipped or repeated if needed, as illustrated above.

In some examples, the adaption of the playback of the media program may comprise switching the playback mode (e.g., of the media player at the playback device) for the media program. As will be understood and appreciated by the skilled person, the playback mode may for example relate to a different way how a media player outputs a media program. For example, in one playback mode the media player waits with processing or outputting the media program until an entire (transport format) segment is received while in another playback mode the media player plays out as soon as it has received sufficient media data for decoding. Thus, when receiving an indication for low target latency, the playback mode may be switched to a mode that corresponds with the low latency requirement, e.g. outputting media data as soon as possible without waiting for reception of full segments.

In some examples, the indication of the sensitivity of a media program to playback latency may be carried in out of band metadata associated with the media program. Such metadata may for example be carried in a Media Program Description (MPD) according to ISO IEC 23009-1 or any other suitable metadata, as will be appreciated by the skilled person. The metadata may be provided in many different ways to the playback device, for example as a configuration file that is read upon startup of the playback device, when switching to a delivery channel, when initially accessing a media stream, and/or upon start of a new media program within a delivery channel. For this purpose, the playback device may be provided with the configuration file or with a link to the configuration file that is accessible for the playback device via the communications network.

In some examples, the indication of the sensitivity of a media program to playback latency may be generated by a (program) scheduler for the consecutive media programs for delivery over the delivery channel. The (program) scheduler may reside in the network side of a content delivery system (e.g., at the broadcaster or operator side, or as a standalone entity). Optionally, the scheduler may also be responsible for adding/inserting the indication of sensitivity into the metadata of the media program via any suitable manner. However, other suitable entities (functional blocks) may be used to add the indication of sensitivity into the metadata of the media program, for example network entities located further upstream. In any case, subsequent steps or entities (especially multiplexing and segmentation steps) should (explicitly) support this metadata as well.

In some examples, the method may further comprise, on the encoder side, adapting an encoding mode for the media program. As will be understood and appreciated by the skilled person, adapting the encoding mode may for example mean encoding the content at reduced frame sizes for latency critical contents and switching back to longer frame duration for non-latency sensitive contents. In particular, the encoding mode may be adapted depending on the sensitivity of the media program to playback latency.

In some examples, the indication of a change in the sensitivity of a media program to playback latency may be signaled via inband events. For example, such inband events may be defined according to ISO IEC 23009-1. Reception of an inband event signaling a change in the sensitivity of a media program to playback latency may then cause the playback device to re-read the metadata for the media program (e.g. MPD) and to reconfigure the internal processing of the media stream associated with the media program as proposed in this disclosure.

In some examples, the sensitivity to playback latency for a media program may be signaled in advance of (before) the start of the particular media program. In such case, it is possible that the playback device (e.g., the player of the playback device) can already start preparation (e.g., preparation of the buffer, adaptation of playback mode, etc.) in advance, so that a seamless viewing experience of the media programs (of different latencies) can be enjoyed.

In some examples, the adaption of the playback of the media program may be asynchronous to the start of the media program. For instance, the player application of the playback device may switch to lower latency before or after a latency sensitive program started, i.e., in an asynchronous (or only loosely synchronized) manner irrespective of the start of media program.

Optionally, the adaption of the playback of the media program may also comprise adapting the playback of the previous media program.

As another broad aspect, there is provided a device for playback of media content via a delivery channel. The delivery channel may generally refer to the channels through which audio or video programs are delivered (transmitted) to the user (receiver), such as in a broadcast or multicast manner. For example, such delivery channel may be a (traditional) "24/7" broadcast channel. The media content may generally comprise consecutive media programs such as news, movies, advertisement, episodes, (live) game shows, live sports, etc. In particular, for a specific media program within the media content, a respective content type for that specific media program is also provided. As will be understood and appreciated by the skilled person, the content type may be represented and delivered in any suitable manner. For example, the content type may be represented or indicated using a specific or an additional field in a header of the media program. As another example, the content type may be indicated using a lookup table. Similarly, the content type may be delivered (transmitted) alongside the delivery of the media program in real time or may be shared before the delivery of the media program. In general, the device may be configured to perform any of the previous method steps.

In particular, the device may comprise a receiver for receiving an indication of the sensitivity of a media program to playback latency. More particularly, the sensitivity of the media program to playback latency may be associated with the content type of the media program. The device may further comprise a receiver for receiving at least a portion of the media program via a media stream. A portion of a media program generally refers to a certain number of frames (pictures, chunks of data, etc.) of the media program, depending on for example the representation and/or delivery of the media program. As will be appreciated by the skilled person, the receiver for receiving the indication of the sensitivity of a media program and the receiver for receiving the media program may be implemented as one single physical receiver capable of receiving and differentiating both types of information (i.e., the indication of sensitivity and the media program) that are packaged e.g. in a single bitstream. In other words, the receiver for receiving the indication of the sensitivity of a media program and the receiver for receiving the media program may be logically separated but are not necessarily to be physically separated. Both types of information may be received at a single physical receiver. For example, only one physical receiver may serve for receiving both the indication of the sensitivity of a media program and the media program. In such cases, the device may comprise a suitable mechanism for separating different input signals that may be received at the same physical receiver. In some examples, the receiver is arranged for receiving information via an Internet Protocol (IP) based communication network. Different physical layers (wireless or wired, copper, fiber) and application protocols (UDP, TCP, http, . . . ) may be used for delivery of the media stream and/or metadata carrying the sensitivity of a media program to playback latency. The communications network is sometimes also called a content delivery network.

The device may further comprise a playback unit for playing the media content. The playback unit may for example invoke some suitable application for the playback of the media content.

The device may yet further comprise a controller for adapting the playback of the media program based on the received indication of its sensitivity to playback latency.

In some examples, the playback unit of the device (e.g. a media player) may comprise a buffer for received segments of the media program. On the other hand, it is also possible that in some cases a buffer is provided for example by the operating system and the playback unit may then be configured to access and make use of that buffer using any suitable manner. The buffer may be implemented for example as a memory (storage) block or in any other suitable manner, as will be appreciated by the skilled person. Moreover, the controller may be configured to adapt the amount of buffered program data before the program data is played back based on the indication of sensitivity to playback latency.

In some examples, the device may further comprise a media content modifier configured to adapt the content of the received media program to insert additional media content or remove media content. In some cases, the media content modifier may be configured to insert/add additional content (e.g., in terms of frames or segments) in the current media program. For instance, the insertion of the additional content(s) may be performed if the current media program allows for a larger latency with respect to the previous media program or the subsequent media program allows for a larger latency with respect to the current media program. In some other examples, the media content modifier may be configured to skip or remove certain content (or part thereof). For instance, this may be performed if the current media program requires a smaller latency with respect to the previous media program or the subsequent media program requires a smaller latency with respect to the current media program.

In some examples, the receiver for receiving an indication of the sensitivity of a media program to playback latency may be configured to decode metadata of the media program or to receive inband events, for example depending on how and where the indication of sensitivity to playback latency (or the change in such sensitivity) is delivered to the playback device as illustrated above. An example of a metadata may be the MPD according to ISO IEC 23009-1, and an example of inband events may be the inband events defined according to ISO IEC 23009-1.

As yet another broad aspect, there is provided a system for delivery of media content via a delivery channel. The delivery channel may generally refer to the channels through which audio or video programs are delivered (transmitted) to the user (receiver), such as in a broadcast or multicast manner. For example, such delivery channel may be a (traditional) "24/7" broadcast channel. The media content may generally comprise consecutive media programs such as news, movies, advertisement, episodes, (live) game shows, live sports, etc. In particular, for a specific media program within the media content, a respective content type for that specific media program is also provided. As will be understood and appreciated by the skilled person, the content type may be represented and delivered in any suitable manner. For example, the content type may be represented or indicated using a specific or an additional field in a header of the media program. As another example, the content type may be indicated using a lookup table. Similarly, the content type may be delivered (transmitted) alongside the delivery of the media program in real time or may be shared before the delivery of the media program. The system may comprise a content delivery server and other components such as a content provider server.

In particular, the system may comprise a scheduler to schedule the media programs for consecutive delivery over the delivery channel. Generally speaking, the scheduling process may comprise scheduling (allocating) proper time of the delivery channel to the media programs. As will be appreciated by the skilled person, the scheduling of the media programs may be performed depending on different circumstances and/or requirements, such as program agendas, importance and/or emergency of programs, etc. The system may further comprise at least one packager (or encapsulator) configured to package (encapsulate) the media programs in a consecutive media stream in any suitable manner. In particular, the packager may be configured to add a respective indication of the sensitivity of the media programs to playback latency to the media stream. As illustrated above, the sensitivity of a media program to playback latency is associated with the content type of the media program.

In some examples, the packager may be configured to further adapt an encoding mode for the media program depending on the sensitivity of the media program to playback latency, e.g. by encoding the media program at reduced segment duration for latency critical content and switch back to longer segment duration for non-latency sensitive content.

In some examples, the packager may be configured to further insert the indication of the sensitivity of the media programs to playback latency in metadata of the media program or in inband events, for example depending on how and where the indication of sensitivity to playback latency is delivered to the playback device as illustrated above. An example of a metadata may be the MPD according to ISO IEC 23009-1, and an example of inband events may be the inband events defined according to ISO IEC 23009-1.

Another aspect of the present disclosure relates to computer software, a computer program product or any media or data embodying computer software instructions for execution on a programmable computer or dedicated hardware comprising at least one processor, which causes the at least one processor to perform any of the method steps disclosed in this document, in particular the disclosed methods as presented in this document.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors.

It will be appreciated that device/apparatus features may be interchanged in many ways. In particular, the details of the disclosed devices can be implemented as a method and vice versa, as the skilled person will appreciate. In addition, the above aspects may be combined in many ways, even if not explicitly disclosed. The skilled person will understand that these combinations of aspects and features/steps are possible unless it creates a contradiction which is explicitly excluded.

Other and further embodiments of the present invention will become apparent during the course of the following discussion and by reference to the accompanying drawings.

BRIEF DESCRIPTION OF THE FIGURES

Embodiments of the disclosure are explained below in an exemplary manner with reference to the accompanying drawings, wherein FIG. 1 schematically illustrates an example of medium content.

DETAILED DESCRIPTION

Figure 1:
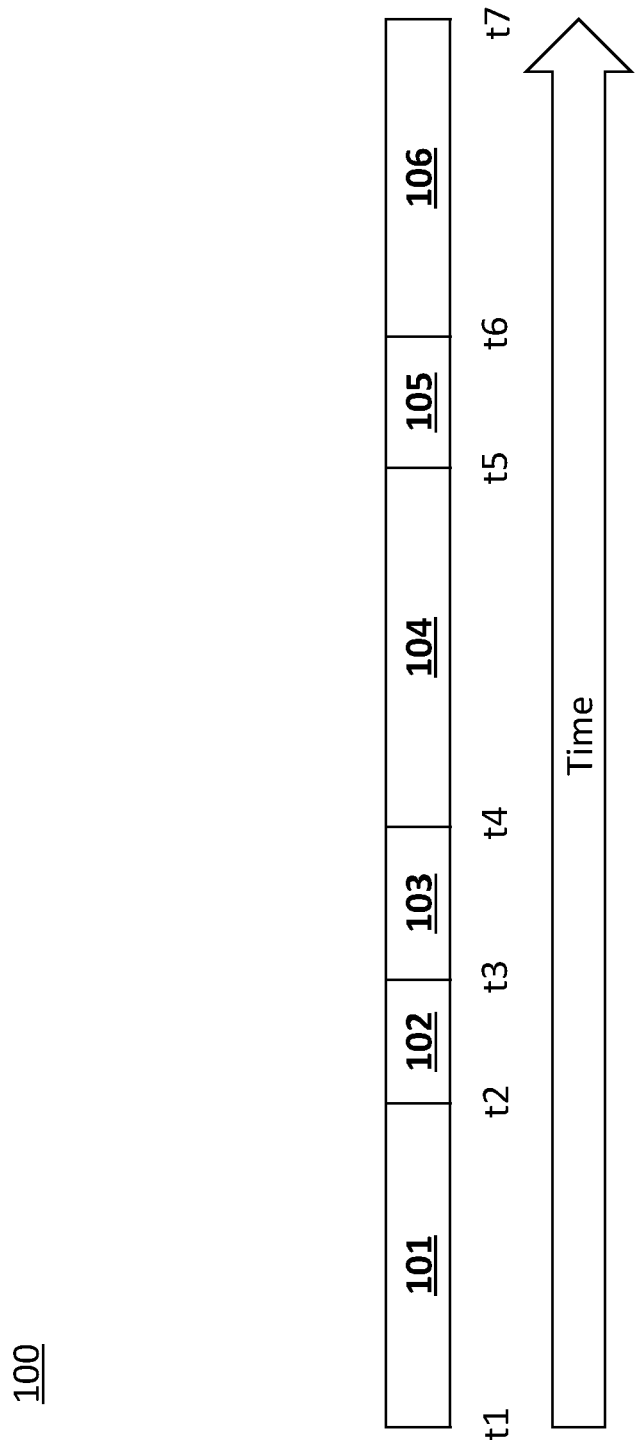

FIG. 1 schematically illustrates an example of a portion of a medium content stream 100 according to an embodiment of the present invention. The media content stream 100 may generally comprise consecutive (different) media programs 101-106. For instance, in the example shown in FIG. 1, the medium content stream 100 may comprise, within the time period t1 to t2, a live sport program 101 (e.g., a football match); within the time period t2 to t3, an advertisement program 102; within the time period t3 to t4, a news program 103; within the time period t4 to t5, a movie program 104; within the time period t5 to t6, another news program 105; and within the time period t6 to t7, a live game show program 106. It should be noted that FIG. 1 shows only a portion of a media content delivery channel which may be operating continuously in a "24/7" manner.

As will be appreciated by the skilled person, the media content stream 100 may comprise other media programs in different time periods and the media content stream 100 as shown in FIG. 1 is merely one example for illustrative purposes. Notably, the media content stream 100 may be delivered from a content distributor via a delivery channel of a content delivery network (not shown in FIG. 1). The delivery channel may generally refer to the channels (e.g., wireless or wired channels) through which audio or video programs are delivered (transmitted) to the end user (receiver/viewer), such as in a broadcast, multicast or unicast manner, or even in a point to point (such as video on demand, VOD) manner. For example, such delivery channel may be a (traditional) "24/7" broadcast channel or any other suitable channel(s), as will be understood and appreciated by the skilled person. The viewer (a playback device) may then play back the received media program(s) in a suitable manner (e.g., using a suitable player application, invoking a proper codec, etc.).

Moreover, to facilitate the delivery of media content stream 100, a content type (not shown in FIG. 1) for a specific media program may be provided for the specific media program within the media content stream 100. In general, the content type of a media program provides a broad categorization of the media program in a number of content classes such as news, sports, shows, movies, etc. The content type may be set by the content provider who produced the media program, or may be set by the operator of the content delivery network. As will be understood and appreciated by the skilled person, the content type may be represented and delivered in any suitable manner. For example, the content type may be represented or indicated using a specific or an additional field in a header of the media program. As another example, the content type may be indicated using a lookup table. Similarly, the content type may be delivered (transmitted) alongside the delivery of the media program in real time or may be shared before the delivery of the media program.

Additionally, there may be further provided an indication of the sensitivity of a specific media program to playback latency (also referred to as target latency). In particular, the sensitivity of the media program to playback latency may be a qualitative indication or a quantitative indication of latency that is acceptable before the media program data is played back and is associated with the content type of the media program.

The key element of determining the target latency for a media program is the content type. In other words, the content type influences/dominates the specification of target latencies. However, there may be a specific step to get from the content type to an indication of target latency, because that mapping is not always unambiguous. For example, a content distributor may choose different target latencies for different soccer matches based on the importance of that soccer match. There are other content types (like non-live content) where the content distributor may choose a fixed default value for the target latency without further adjustments/fine-tunings. But in other cases, a human that creates the program schedule may choose to deviate from such default values (e.g. the final soccer match in the world championship gets the lowest possible latency, while other soccer matches will not target such an aggressively low number). Thus, the target latency of a media program is determined based on the content type, but is not exclusively set according to the content type.

On the side of a playback device, at least a portion of the media program and the target latency for the media program are received. A portion of a media program generally refers to a certain number of frames (pictures, chunks of data, etc.) of the media program, depending for example on the representation and/or the delivery method/mechanism of the media program. Next, the playback of the media program is adapted based on its target latency. The target latency may be changed in a single step (e.g. from low to high) and the media player in the playback device may be adapted accordingly. In addition, an adaptation of a media player in the playback device over a certain time period is proposed, e.g. in order to catch up or slow down buffer levels and/or playback speed. A playout adaptation algorithm on the receiving side may have a given characteristic to interpolate between a given target latency and an update in the target latency which may perform in an undesired fashion if the jump in target latency was too severe. One could therefore gradually (in multiple steps) change the indicated target latency on the server side, hence remotely controlling the adaptation speed and managing the buffer levels on the receiver side e.g. prior to a transition to another program with different target latency. Thus, in addition to a single jump in target latency, an adaptation of the playback of the media program over a number of steps arranged over a certain time period is suggested. In the latter case, the signaled target latency is gradually changed by the server in multiple sequential indications for playback latency.

Figure 2:
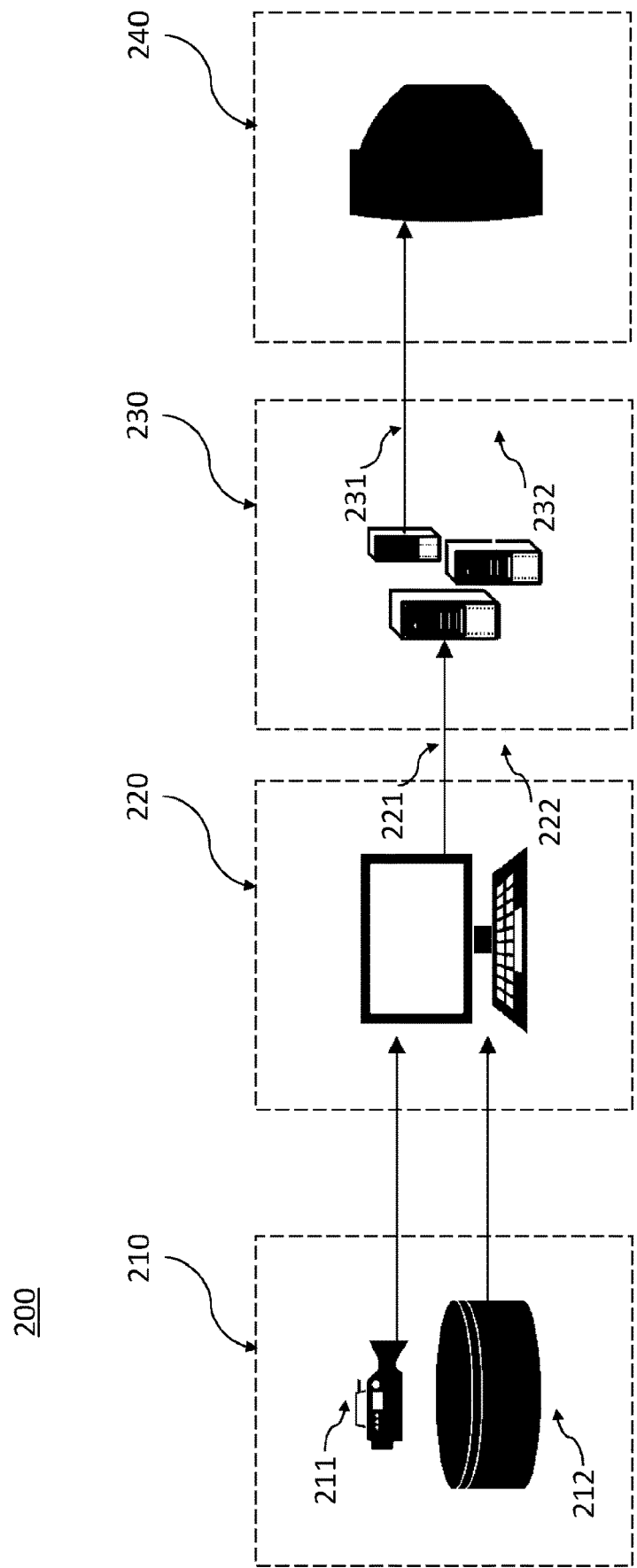
FIG. 2 schematically illustrates an example of a system for delivery of medium content.

FIG. 2 schematically illustrates an example of a system 200 for delivery of medium content. The media content may comprise consecutive media programs as shown in 101-106 as shown in FIG. 1. In the example of FIG. 2, the system 200 may for example comprise a service (content) provider 210, for preparation and provision of the different media programs (e.g., the media programs as shown in 101-106 as shown in FIG. 1). By way of example without any limitation, the content provider 210 may be an operator, a video program platform, or any other suitable provider as will be appreciated by the skilled person. In particular, in some cases, the programs may be live (real time) programs 211 such as sports, live game shows, etc. In some other cases, the programs may be non-real-time programs 212 such as advertisements, movies, etc. Such non-real-time programs 212 may be prepared (produced) in advance of the start of the programs.

The available programs 211 and 212 may be delivered/transmitted in real time or in advance to a scheduler 220 of the system 200. As will be understood and appreciated by the skilled person, the scheduler 220 may be implemented for example as a standalone application, a functional block of a controller, or in any other suitable manner. The scheduler 220 may reside in a computer or in a server that is connectable (in a suitable wireless, wired, etc., manner) to the content provider 210. The scheduler may be part of a content distribution system.

The scheduler 220 may be configured to schedule the media programs for consecutive delivery over the delivery channel. As will be appreciated by the skilled person, the scheduling of the media programs may be performed depending on different circumstances and/or requirements, such as program agendas, priorities of programs, etc. Generally speaking, the scheduling process may comprise scheduling (allocating) proper time resources of the delivery channel to the media programs, for example based on the characteristics of the delivery channel. The scheduled media programs may then be delivered/passed via a suitable interface 221 for example to an encoder, a packager, a segmenter, an encrypter, and/or a manifest generator (these functions may appear in slightly different orders and may be combined into fewer processing steps.) 230 to package/encode media programs in a consecutive media stream in any suitable manner. The packaged media programs (i.e., the media content) may then be delivered (e.g., broadcast) to the playback device 240 of the end user via a suitable network connection 231, e.g., IP connection. Encoding/decoding may refer to respective processing of any media content such as audio and/or video encoding/decoding.

Apart from scheduling and delivering the media programs properly, the scheduler 220 may also be responsible for indicate the sensitivity of the media programs to playback latency to downstream device(s), such as at least one packager 230, via a suitable interface 222. Similarly, the at least one packager 230 may accordingly propagate the indication of the sensitivity of the media programs to playback latency to the playback device 240 of the end user in a suitable manner via a suitable network connection 232.

Notably, in some cases, the packager 230 can be configured to package (multiplex) the indication of the sensitivity of the media programs to playback latency together with the media programs themselves in a bitstream. For instance, the indication of the sensitivity of the media programs to playback latency may be packaged (encapsulated) by the packager 230 in metadata of the media program. An example of a metadata may be the MPD according to ISO IEC 23009-1. In addition, changes in metadata such as the indication of the sensitivity to playback latency may be signaled via inband events. Configured as such, the two logical (network) connections 231 and 232 used for respectively delivering the media programs and the indications of sensitivity may not be necessarily to be separated and thus only one suitable connection can be used to delivery both the media programs and the indication of sensitivity to the playback device 240.

In some cases, the packager 230 may be configured to further adapt an encoding mode for the media programs depending on the respective sensitivity of the media program to playback latency, e.g., by encoding the media program at reduced segment duration for latency critical content and switch back to longer segment duration for non-latency sensitive content.

As will be understood and appreciated by the skilled person, the playback device 240 typically comprises one or more suitable components, such as receiver(s), buffer(s), a processor, a display/monitor, speakers, etc., which will be described in greater detail later. In particular, in order to properly play back the received media content, the playback device 240 typically needs to set up its playback chain (e.g., application, codec, buffer, etc.), in particular in support of the desired latency of the media programs. Particularly, depending on different cases, the setup may include reducing (or increasing) the number of segments (or frames) buffered in the playback device to reduce (or increase) latency. Moreover, the setup may also include, depending on different cases (such as the transport format used), switching to specific (e.g., low latency) playback modes. An example of the low latency mode may be the low latency presentation specified in ETSI TS 103 285 V1.3.1, based on Common Media Application Format (CMAF) as specified in ISO/IEC 23000-19.

Figure 3:
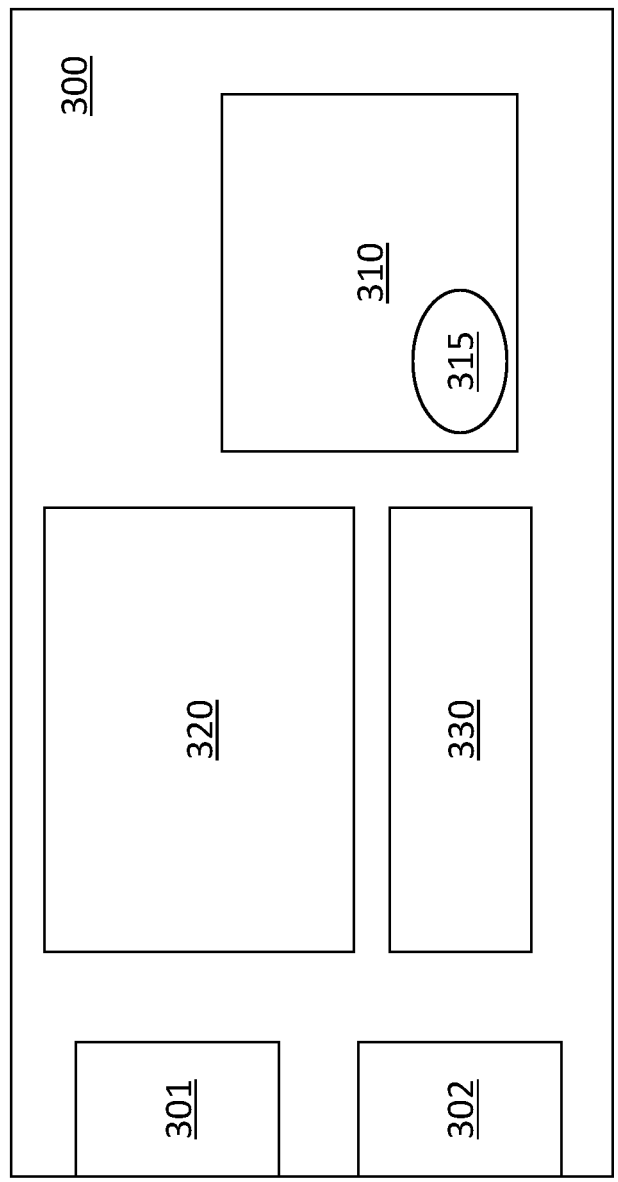
FIG. 3 schematically illustrates an example of a device for playback of media content according to an embodiment of the present invention.

FIG. 3 schematically illustrates an example of a device 300 for playback of media content according to an embodiment of the present invention. The device 300 may correspond to the playback device 240 of FIG. 2. The media content provided by a delivery channel may correspond to or similar as the medium content 100 of FIG. 1 comprising consecutive media programs and has a respective content type associated with the media program.

In particular, the device 300 may comprise a receiver 301 for receiving an indication of the sensitivity of a media program to playback latency. The sensitivity of the media program to playback latency is associated with the content type of the media program. As illustrated above, the indication of the sensitivity may be scheduled by the scheduler 220 of FIG. 2 and packaged by the at least one packager 230 of FIG. 2, before being received by the device 300. Depending on the how the indication of sensitivity is packaged (encoded) at the packager side, the receiver 301 may also be configured to unpackage (extract or decode) such indication appropriately. For example, if the indication of sensitivity is in metadata (such as the MPD according to ISO IEC 23009-1), the receiver 301 may be configured to extract the indication from such metadata. In some examples, the metadata is provided as a configuration file that is read by the receiver 301 upon startup, when switching to a delivery channel, when initially accessing a media stream, and/or upon start of a new media program within a delivery channel.

The device 300 may further comprise a receiver 302 for receiving at least a portion of the media program. A portion of a media program generally refers to a certain number of frames (pictures, chunks of data, etc.) of the media program, depending on for example the representation and/or delivery of the media program.

As will be appreciated by the skilled person, the receiver 301 for receiving the indication of the sensitivity of a media program (i.e. the target latency) and the receiver 302 for receiving the media program may be implemented as one single receiver capable of receiving and differentiating both inputs (i.e., the indication of sensitivity and the media program). In other words, the receiver 301 for receiving the indication of the sensitivity of a media program and the receiver 302 for receiving the media program may be logically separated but are not necessarily to be physically separated. Both inputs may be received at a single physical receiver. For example, only one physical receiver may serve for receiving both the indication of the sensitivity of a media program and the media program. In such cases, the device 300 may comprise a suitable mechanism for separating different input signals that may be received at the same physical receiver.

The device 300 may further comprise a playback unit 310 for playing the media programs of the media content. The playback unit 310 may for example invoke some suitable application (and optionally a suitable codec) for the playback of the media content, as will be appreciated by the skilled person. In some cases, the playback unit of the device may comprise a buffer 315 for storing and accessing received segments of the media program. On the other hand, it is also possible that in some cases a buffer is provided for example by the operating system and the playback unit may then be configured to access and make use of that buffer using any suitable manner. The buffer 315 may be implemented for example as a memory (storage) block or in any other suitable manner, as will be appreciated by the skilled person.

The device 300 may yet further comprise a controller 320 for adapting the playback of the media program based on the received indication of its sensitivity to playback latency. In some cases, the controller 320 may be configured to adapt the amount of buffered program data before the program data is played back based on the indication of sensitivity to playback latency. In particular, changes on the playback device 300 can be done in an asynchronous matter. That is to say, the playback (e.g., on a player application of the device 300) may be switched (e.g., by the controller 320) to lower latency before or after a latency sensitive program started. In either case it is required for the playback to either catchup to a lower latency playback from a higher latency playback or to increase its latency. The controller 320 may comprise a playout adaptation algorithm to interpolate between a current target latency and a newly received target latency to avoid an undesired severe jump in target latency.

In some cases, the device 300 may yet further comprise a media content modifier 330 configured to adapt the content of the received media program to insert additional media content or remove media content. In particular, the media content modifier 330 may be configured to insert/add additional content (e.g., in terms of frames or segments) in the current media program. The additional content may for example be "silent" (empty) segments or repetitive segments. For example, the insertion of the additional content(s) may be performed if the current media program allows for a larger latency with respect to the previous media program or the subsequent media program allows for a larger latency with respect to the current media program. In some other examples, the media content modifier 330 may be configured to skip or remove certain content (or part thereof). For instance, this may be performed if the current media program requires a smaller latency with respect to the previous media program or the subsequent media program requires a smaller latency with respect to the current media program. However, in some cases, such changes of adding or removing content may be noticeable by the viewer and thus may be considered as less desirable.

Alternatively or additionally, the controller 320 (or some other component of the device 300) may be configured to control the playback speed to be faster or slower than real-time, to either catchup or increase latency. For example, the playback unit 310 may comprise an algorithm that can change playback speed, often combined with pitch correction for audio. Typically, changing playback speed should be done without changing the pitch of the audio signal. Generally speaking, differences of 10%-20% in speed playback are usually considered to be not noticeable/objectionable to the viewer. Therefore, a transition period to go from higher latency (for example 25 seconds) to lower latency (for example 2 second) may require to speed up the playback (for example by 10%) for about 230 seconds, almost 4 minutes. In such cases, this also means that for short time period programs (e.g., advertisements), it is less likely to change latency since transition periods are longer than the actual content.

Moreover, in order to prevent re-buffering events (e.g., in case the player needs to interrupt playback due to missing data for decoding), especially when switching from small to large segments (switching from low to high latency), the device 300 should be notified of such a change in advance. For example, inband events as defined in ISO/IEC 23009-1 can be used for such signaling. As indicated above, the same or different inband events can also be used to inform a player about changes in the sensitivity to latency. For instance, an inband event may also be used to signal a change in the MPD. In case of receiving such inband event, the player may access the MPD again in order to determine the changes in the program metadata such as a change in sensitivity to playback latency.

It is to be noted that in FIG. 3 the interconnections between the respective units/components within the device 300 are omitted for the sake of conciseness. However, as will be understood and appreciated by the skilled person, the device 300 may comprise and/or provide such interconnections for exchanging (internal) messages between the units/components within the device 300 if necessary. It is also to be noted that other units/components may also be present in the device 300 for the successful operation of the device 300, although they might not be shown in FIG. 3. Such units/components may for example include, but not limited to, a display/monitor for displaying the played back programs, one or more speakers for outputting the audio, etc.

Figure 4:
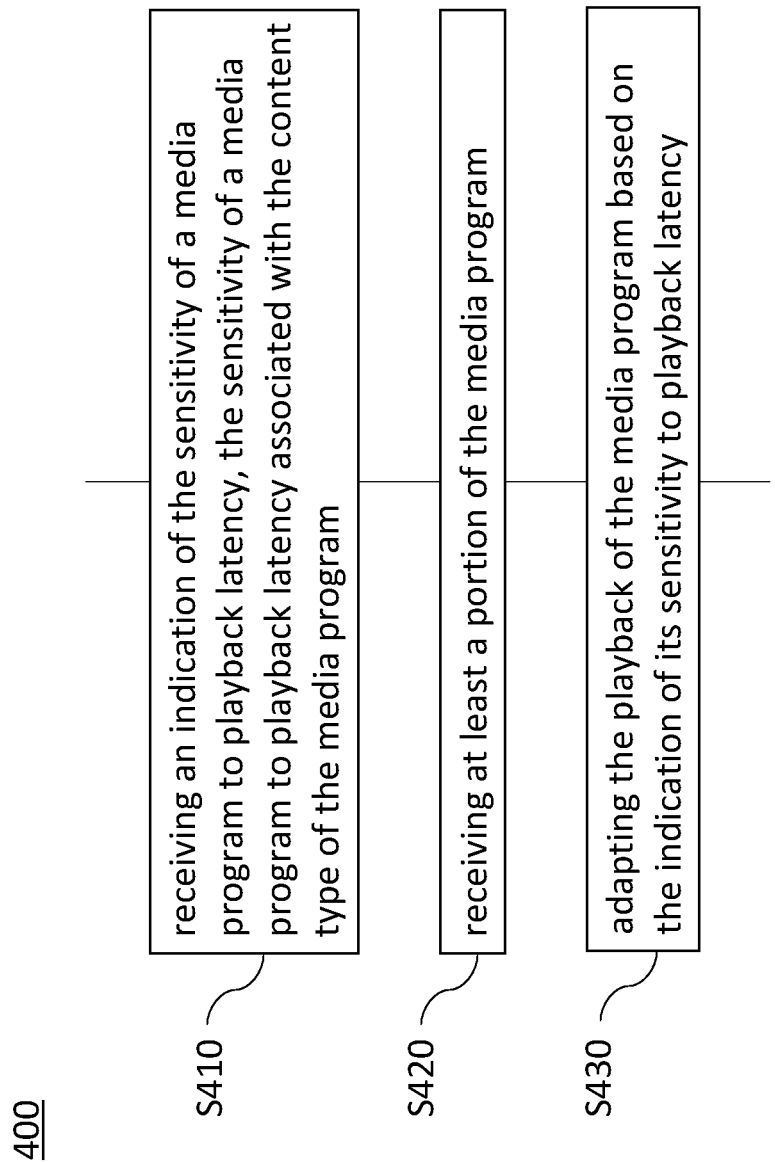
FIG. 4 schematically illustrates an example of a method for playback of media content according to an embodiment of the present invention.

FIG. 4 schematically illustrates an example of a method 400 for playback of media content according to an embodiment of the present invention. The method 400 may be performed for example by the playback device 300 of FIG. 3. The media content may correspond to or similar as the medium content 100 of FIG. 1 comprising consecutive media programs and has a respective content type associated with the media program.

In particular, the method 300 may comprise step S410 of receiving an indication of the sensitivity of a media program to playback latency. In particular, the sensitivity of a media program to playback latency is associated with the content type of the media program. The method 400 may further comprise step S420 of receiving at least a portion of the media program. Finally, the method 400 may also comprise step S430 of adapting the playback of the media program based on the indication of its sensitivity to playback latency.

It should be noted that the apparatus (device) features described above correspond to respective method features that may however not be explicitly described, for reasons of conciseness. The disclosure of the present document is considered to extend also to such method features. In particular, the present disclosure is understood to relate to methods of operating the devices described above, and/or to providing and/or arranging respective elements of these devices.

It should also be noted that the disclosed embodiments can be implemented in many ways using hardware and/or software configurations. For example, the disclosed embodiments may be implemented using dedicated hardware and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of this disclosure.

It should further be noted that the description and drawings merely illustrate the principles of the present disclosure. Those skilled in the art will be able to implement various arrangements that, although not explicitly described or shown herein, embody the principles of the invention and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

Various aspects of the present invention may be appreciated from the following enumerated example embodiments (EEEs):

1. Method for playback of media content via a delivery channel, the media content comprising consecutive media programs having a respective content type, the method comprising:
   receiving an indication of the sensitivity of a media program to playback latency, the sensitivity of a media program to playback latency associated with the content type of the media program;
   receiving at least a portion of the media program;
   adapting the playback of the media program based on the indication of its sensitivity to playback latency.
2. Method of EEE 1, wherein the adapting the playback of the media program comprises adapting the buffering of the media program, in particular adapting the amount of media program data that is buffered before the media program data is played back.
3. Method of EEE 1 or 2, wherein the indication of the sensitivity of a media program to playback latency comprises a qualitative indication of latency that is acceptable before the media program data is played back.

4. Method of any previous EEE, wherein the adapting the playback of the media program comprises adapting playback speed for the media program.

5. Method of any previous EEE, wherein the adapting the playback of the media program comprises modifying the content of the received media program if the indication of sensitivity to playback latency for the media program changes with respect to a previous or a subsequent media program of the delivery channel.

6. Method of EEE 5, wherein additional content is inserted in the current media program if the current media program allows for a larger latency with respect to the previous media program or the subsequent media program allows for a larger latency with respect to the current media program.

7. Method of EEE 5, wherein content is skipped in the current media program if the current media program requires a smaller latency with respect to the previous media program or the subsequent media program requires a smaller latency with respect to the current media program.

8. Method of EEEs 6 or 7, wherein a media program comprises a plurality of consecutive segments, and wherein the adapting the playback of the media program comprises adapting the number of buffered segments before the media program data is played back, wherein optionally at least one segment of the media program is skipped or repeated.

9. Method of any previous EEE, wherein the adapting the playback of the media program comprises switching the playback mode for the media program in media player of a playback device.

10. Method of any previous EEE, wherein another indication of the sensitivity of a media program to playback latency is received and the playback of the media program is gradually adapted based on the received indications.

11. Method of any previous EEE, wherein the indication of the sensitivity of a media program to playback latency is generated by a scheduler for the consecutive media programs for delivery over the delivery channel, and optionally added into metadata of the media program.

12. Method of any previous EEE, further comprising adapting an encoding mode for the media program depending on the sensitivity of the media program to playback latency.

13. Method of any previous EEE, wherein the indication of a change of the sensitivity of a media program to playback latency is signaled via inband events, e.g. according to ISO IEC 23009-1.

14. Method of EEE 13, wherein the sensitivity to playback latency for a media program is signaled in advance of the start of the media program.

15. Method of EEE 14, wherein the adapting the playback of the media program is asynchronous to the start of the media program and optionally comprises adapting the playback of the previous media program.

16. Device for playback of media content via a delivery channel, the media content comprising consecutive media programs having a respective content type, the device comprising:
a receiver for receiving an indication of the sensitivity of a media program to playback latency, the sensitivity of a media program to playback latency associated with the content type of the media program;
a receiver for receiving at least a portion of the media program;
a playback unit for playing the media content; and
a controller for adapting the playback of the media program based on the received indication of its sensitivity to playback latency.

17. Device of EEE 16, wherein the playback unit comprises a buffer for received segments of the media program and the controller adapts the amount of buffered program data before the program data is played back based on the indication of sensitivity to playback latency.

18. Device of EEE 16 or 17, further comprising a media content modifier to adapt the content of the received media program to insert additional media content or remove media content.

19. Device of any of EEEs 16 to 18, wherein the receiver for receiving an indication of the sensitivity of a media program to playback latency is configured to at least one of decode metadata of the media program and receive inband events.

20. System for delivery of media content via a delivery channel, the media content comprising consecutive media programs having a respective content type, the system comprising:
a scheduler to schedule the media programs for consecutive delivery over the delivery channel;
at least one packager to package the media programs in a consecutive media stream, wherein the packager is configured to add an indication of the sensitivity of the media programs to playback latency to the media stream, the sensitivity of a media program to playback latency associated with the content type of the media program.

21. System of EEE 20, wherein the packager is configured to adapt an encoding mode for the media program depending on the sensitivity of the media program to playback latency.

22. System of EEE 20 or 21, wherein the packager is configured to at least one of package the indication of the sensitivity of the media programs to playback latency in metadata of the media program and signal changes in playback latency via inband events.

The invention claimed is:

1. A method of playback of media content via a delivery channel, the media content comprising consecutive media programs having a respective content type, the method comprising:
receiving, over a period of time, multiple indications of the sensitivity of a media program to playback latency, the sensitivity of the media program to playback latency associated with the content type of the media program;
receiving at least a portion of the media program;
prior to transitioning to playback of the media program, adapting playback of a current media program in response to the multiple indications until a target latency for the media program is reached; and
playing back the media program in accordance with the target latency.

2. The method of claim 1, wherein the indication of the sensitivity of a media program to playback latency comprises a qualitative indication of latency that is acceptable before the media program data is played back.

3. The method of claim 1, wherein the adapting the playback of the media program comprises modifying the content of the media program if the indication of sensitivity to playback latency for the media program changes with respect to a previous or a subsequent media program of the delivery channel.

4. The method of claim 3, wherein additional content is inserted in the media program if the media program allows for a larger latency with respect to the previous media program or the subsequent media program allows for a larger latency with respect to the media program, or
wherein content is skipped in the media program if the media program requires a smaller latency with respect to the previous media program or the subsequent media program requires a smaller latency with respect to the media program.

5. The method of claim 4, wherein a media program comprises a plurality of consecutive segments, and wherein the adapting the playback of the media program comprises adapting a number of buffered segments before the media program data is played back, wherein optionally at least one segment of the media program is skipped or repeated.

6. The method of claim 1, wherein the adapting the playback of the media program comprises switching the playback mode for the media program in media player of a playback device.

7. The method of claim 1, wherein the multiple indications of the sensitivity of a media program to playback latency is generated by a scheduler for the consecutive media programs for delivery over the delivery channel, and optionally added into metadata of the media program.

8. The method of claim 1, wherein the indication of a change of the sensitivity of a media program to playback latency is signaled via in-band events, according to ISO IEC 23009-1.

9. The method of claim 8, wherein the sensitivity to playback latency for a media program is signaled in advance of the start of the media program.

10. The method of claim 9, wherein the adapting the playback of the media program is asynchronous to the start of the media program and optionally comprises adapting the playback of the previous media program.

11. An apparatus for playback of media content via a delivery channel, the media content comprising consecutive media programs having a respective content type, the device comprising:
a receiver for receiving multiple indications of the sensitivity of a media program to playback latency, the sensitivity of the media program to playback latency associated with the content type of the media program;
a receiver for receiving at least a portion of the media program;
a controller for, prior to transitioning to playback of the media program, adapting playback of a current media program in response to the multiple indications until a target latency for the media program is reached; and
a playback unit for playing back the media program in accordance with the target latency.

12. The apparatus of claim 11, further comprising a media content modifier to adapt the content of the received media program to insert additional media content or remove media content.

13. The apparatus of claim 11, wherein the receiver for receiving the multiple indications of the sensitivity of the media program to playback latency is configured to at least one of decode metadata of the media program and receive in-band events.

14. A system for delivery of media content via a delivery channel, the media content comprising consecutive media programs having a respective content type, the system comprising:
a scheduler to schedule the media programs for consecutive delivery over the delivery channel; and
at least one packager to package the media programs in a consecutive media stream, wherein the packager is configured to add to the media stream multiple indications of the sensitivity of at least one media program to playback latency, the sensitivity of at least one media program to playback latency associated with the content type of the at least one media program, wherein the multiple indications of the sensitivity of the at least one media program to playback latency causes playback of a current media program on a playback device to be adapted until a target latency for the at least one media program is reached.

15. The system of claim 14, further comprising adapting an encoding mode for the media programs depending on the sensitivity of the media programs to playback latency.

16. The system of claim 14, wherein the packager is configured to at least one of package the multiple indications of the sensitivity of the media programs to playback latency in metadata of the media programs and signal changes in playback latency via in-band events.

* * * * *